US007705513B1

(12) United States Patent
West et al.

(10) Patent No.: US 7,705,513 B1
(45) Date of Patent: Apr. 27, 2010

(54) THERMAL TO ELECTRICITY CONVERSION USING THERMAL MAGNETIC PROPERTIES

(75) Inventors: Phillip B. West, Idaho Falls, ID (US); John Svoboda, Idaho Falls, ID (US)

(73) Assignee: United States of America as represented by the United States Department of Energy, Washington, DC (US)

( * ) Notice: Subject to any disclaimer, the term of this patent is extended or adjusted under 35 U.S.C. 154(b) by 456 days.

(21) Appl. No.: 11/859,916

(22) Filed: Sep. 24, 2007

(51) Int. Cl.
*H02N 10/00* (2006.01)
(52) U.S. Cl. .................................... 310/306
(58) Field of Classification Search ................. 310/309
See application file for complete search history.

(56) References Cited

U.S. PATENT DOCUMENTS 3,928,870 A * 12/1975 Ahrenkiel et al. ............. 360/59
5,680,373 A * 10/1997 Sato et al. ................. 369/13.52
7,230,844 B2 * 6/2007 Deak .......................... 365/171
7,615,970 B1 * 11/2009 Gimlan ....................... 320/166
7,640,980 B2 * 1/2010 Vinegar et al. .............. 166/268

* cited by examiner

*Primary Examiner*—Mark Budd
(74) *Attorney, Agent, or Firm*—Michael J. Dobbs; Daniel D. Park; Paul A. Gottlieb

(57) ABSTRACT

A system for the generation of Electricity from Thermal Energy using the thermal magnetic properties of a Ferromagnetic, Electrically Conductive Material (FECM) in one or more Magnetic Fields. A FECM is exposed to one or more Magnetic Fields. Thermal Energy is applied to a portion of the FECM heating the FECM above its Curie Point. The FECM, now partially paramagnetic, moves under the force of the one or more Magnetic Fields. The movement of the FECM induces an electrical current through the FECM, generating Electricity.

20 Claims, 5 Drawing Sheets

THERMAL TO ELECTRICITY CONVERSION USING THERMAL MAGNETIC PROPERTIES

GOVERNMENT INTERESTS

The United States Government has rights in this invention pursuant to Contract No. DE-AC07-05ID14517 between the U.S. Department of Energy (DOE) and Battelle Energy Alliance LLC.

FIELD OF THE INVENTION

The present invention relates to the generation of electricity from thermal energy, preferably from small temperature differences. More particularly, the present invention relates to a method and apparatus for the conversion of thermal energy to electricity using the thermal-magnetic properties of a Ferromagnetic, Electrically Conductive Material.

BACKGROUND OF THE INVENTION

For decades there has been a constant search for methods, techniques, and equipment for the generation of Electricity. Although there have been significant advances in large scale energy generation, there has been little success in converting Thermal Energy (heat) to Electricity, especially solutions capable of operating on small temperature differences. Furthermore, current large scale Electricity generation systems discard significant Thermal Energy that could be used to produce additional Electricity, increasing the overall efficiency of the system.

The Stirling Engine, developed in 1816, is one method of generating Electricity from Thermal Energy. The Stirling Engine can achieve a rather high efficiency, up to 80% of the Carnot efficiency, limited only by non-ideal properties of the working gas and engine materials.

Stirling Engines use a closed cycle system having a trapped gas, "working fluid," commonly air, hydrogen or helium. The engine is sealed and the engine passes through a cooling phase, a compression phase, a heating phase, and an expansion phase. The engine moves through the various phases as the "working fluid" is heated by an external heat source and cooled by a cold source, commonly a heat exchanger. Changes in gas temperature causes a corresponding change in gas pressure, while the motion of the engine causes gas to be alternately expanded and compressed. The motion produced by the engine can be attached to an Electric Generator to produce Electricity.

Therefore, the greater the temperature difference between the hot and cold sources, the greater the power output of the Stirling Engine. Stirling Engines can run on low temperature differences, for example, the difference between room temperature and a human hand can be used by a Stirling Engine to produce about 1 watt. However, these systems are large, heavy and inefficient for the miniscule power they produce.

Unfortunately, Stirling Engines require both input and output heat exchangers designed to contain the pressure of the working fluid at high temperatures while resisting corrosive effects of the heat source and of the atmosphere. Furthermore, at low temperature differences between the hot and cold sources, Stirling Engines do not produce enough energy to justify their cost, weight and size. Stirling Engines also have a number of disadvantages such as the need to warm up, creating a delayed start, and the necessity for an Electric Generator to convert the generated mechanical energy into Electricity, thereby increasing the size of the system, while decreasing efficiency.

Turbines are commonly used to extract Thermal Energy from a pressurized steam converting it to Mechanical Energy. The Mechanical Energy commonly drives an Electric Generator to produce Electricity. Although these systems are commonly used, they generally rely on high pressure, high temperature steam, which cannot be produced from small thermal sources, or small temperature differences. While efficient for larger energy production, Turbines are not suitable for small scale energy production.

Stirling Engines and Turbines convert Thermal Energy into Mechanical Energy, which, unfortunately, must go through another conversion via an Electric Generator or similar device to convert the Mechanical Energy into Electricity.

Electric Generators convert Mechanical Energy into Electricity using electromagnetic induction. Electric Generators use mechanical energy to rotate a coil about a permanent or powered magnet. Smaller Electric Generators, using permanent magnets, are generally about 40% efficient. With smaller, more powerful rare-earth magnets, efficiency can be increase to about 60%.

More efficient Electric Generators, using a field coil in place of a permanent magnet to generate a magnetic field, can achieve efficiencies of up to 90%. A battery is generally used to power the field coil before a sufficient amount of Electricity is generated by the Electric Generator itself. This external source makes field coil based Electric Generators bulky and unsuitable for smaller designs.

Unfortunately, Electric Generators decrease the efficiency of a system while also adding weight and bulk, for example the weight and bulk of a permanent magnet or field coil.

Magnetohydrodyamic (MHD) generators are another method of transforming Mechanical Energy from Stirling Engine or Turbine based systems into Electricity. Generally in MHD systems, a conductive fluid is pumped by Mechanical Energy in the presence of a magnetic field. Similar to the conductive winding of an Electric Generator, a current is induced in the liquid, generating Electricity. Typically, MHD systems are about 17% efficient, making MHD systems undesirable for larger scale energy production.

Other systems similar to the one described in U.S. Pat. No. 4,191,901, hereby fully incorporated by reference, utilize a MHD design using the thermal expansion properties of a liquid. In these systems, thermal energy is applied to a sealed liquid. As the liquid is heated by thermal energy it is driven by free convection and moved a reduction in density of the heated liquid, which pushes the liquid through the system. Unfortunately, these systems have very poor efficiencies and result in an over complicated, over-sized and heavy solution for the energy they produce.

U.S. Pat. Nos. 2,510,397; 2,881,384; and 2,915,652, hereby fully incorporated by reference, describe devices capable of generating Electricity from temperature differences from thermionic emission within solid state devices. These devices commonly use two semiconductors, an anode and a cathode. The cathode is constructed of a material having a higher work function than the anode. Application of sufficient heat to the cathode causes thermionic emission, causing a small percentage of emitted electrons to reach the anode (moving from the higher work function of the cathode to the lower work function of the anode). Unfortunately, these systems are plagued by low power generation, and poor efficiency.

Generally, electrons freed by thermal energy at the cathode are motivated to traverse to the anode only by the different work functions. The presence of a cloud of free electrons in the anode, tend to repel electrons emitted from the cathode, known as the Space Charge Effect. This phenomenon limits electron movement between the cathode and anode to only those having a high enough velocity to pass through the Space Charge, significantly reducing efficiently. Although small, these systems have been unable to achieve any sizable power generation and are too cost prohibitive given the power they produce.

The foregoing solutions utilize substantially mature technologies. It is desirable to have a new method of generating electricity from thermal energy capable of maturing into methods and devices having properties unachievable by current methods.

Therefore it is desirable to generate Electricity in a compact, efficient manner from small temperature differences. Furthermore, it is desirable to have a system capable of directly producing Electricity without the need of an Electronic Generator, adding weight, size, while reducing efficiency.

SUMMARY OF THE INVENTION

The present invention relates to a method and device for the direct conversion of Thermal Energy (heat) to Electricity. It may operate using a working fluid or may be based on the mechanical motion of a solid. Thermal Energy is used to drive a special magnetic system generating Electricity.

More specifically, the present invention relates to a system for the generation of Electricity from Thermal Energy using thermal magnetic properties of a Ferromagnetic, Electrically Conductive Material (FECM) in the presence of one or more magnetic fields. The FECM, a solid or a fluid, is exposed to one or more magnetic fields. Thermal Energy is applied to a portion of the FECM creating a Heated Area, heated above its Curie Point, the temperature above which a ferromagnetic material loses its ferromagnetism and becomes paramagnetic.

As the Heated Area becomes paramagnetic, the remaining portion of the FECM, the Active Magnetic Area (AMA), generates a force on the FECM in response to the new magnetic properties of the FECM in the presence of the one or more Magnetic Fields. The AMA generates a force due to the creation of the Heated Area. As the Heated Area is paramagnetic and has only a minimal amount of magnetic interaction, the AMA produces a force to position itself more directly in the one or more Magnetic Fields, therefore moving the Heated Area away the from one or more Magnetic Fields.

The movement of the FECM within the one or more magnetic fields induces an electrical current through at least an Electrically Induced Area of the FECM positioned perpendicular to a vector component of a magnetic field from the one or more magnetic fields and the movement of the FECM. The induced electrical current is then transferred from the Electrically Induced Area of the FECM to one or more electrodes thereby generating Electricity. As the FECM moves, the Heated Area and AMA are continuously altered by Thermal Energy thereby continuously moving the FECM and generating electricity.

DETAILED DESCRIPTION OF THE INVENTION

A system for the generation of Electricity from Thermal Energy using thermal magnetic properties of a Ferromagnetic, Electrically Conductive Material (FECM) in the presence of one or more magnetic fields. A FECM is exposed to one or more magnetic fields. Thermal Energy is applied to a portion of the FECM creating a Heated Area heated above its Curie Point, the temperature above which a ferromagnetic material loses its ferromagnetism and becomes paramagnetic.

As the Heated Area becomes paramagnetic, the remaining portion of the FECM, the Active Magnetic Area (AMA), generates a force on the FECM in response to the new magnetic properties of the FECM in the presence of the one or more Magnetic Fields. The AMA generates a force due to the creation of the Heated Area. As the Heated Area is paramagnetic and has only a minimal amount of magnetic interaction, the AMA produces a force to position itself more directly in the one or more Magnetic Fields, therefore pushing the Heated Area away the from one or more Magnetic Fields.

The movement of the FECM within the one or more magnetic fields induces an electrical current through at least an Electrically Induced Area of the FECM positioned perpendicular to a vector component of a magnetic field from the one or more magnetic fields and the movement of the FECM. The induced electrical current is then transferred from the Electrically Induced Area of the FECM to one or more electrodes thereby generating Electricity. As the FECM moves, the Heated Area and AMA are continuously altered by Thermal Energy thereby continuously moving the FECM and generating electricity.

Figure 1:
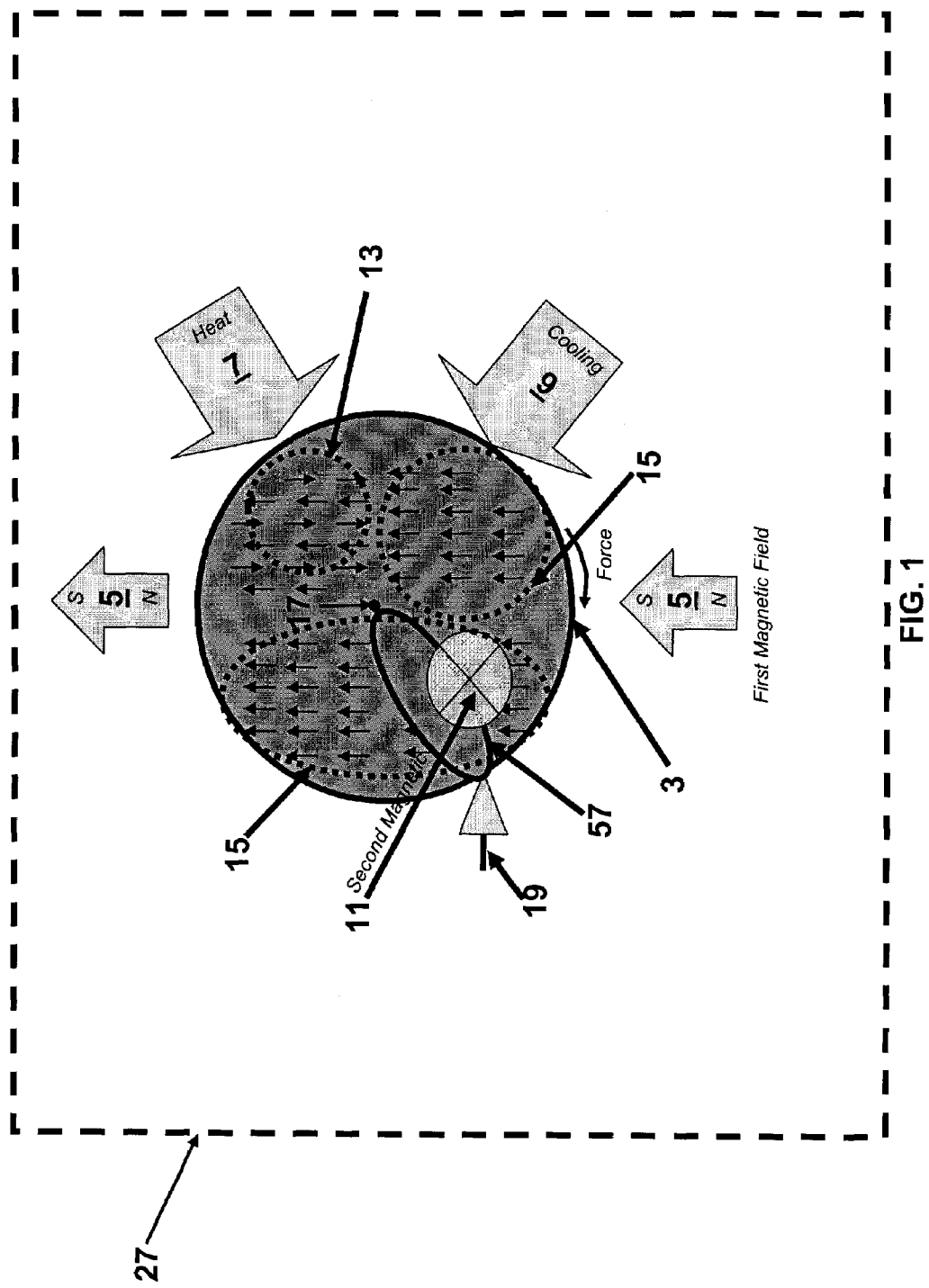
FIG. 1 depicts an embodiment of a Thermal to Electricity Converter using thermal magnetic properties of a rotated Wheel.

FIG. 1 Thermal to Electricity Converter Using the Thermal Magnetic Properties of a Rotated FECM Wheel FIG. 1 depicts an embodiment of a Thermal to Electricity Converter using the thermal magnetic properties of a solid FECM Wheel. A Casing Means 27 contains a Ferromagnetic, Electrically Conductive Wheel 3, a Heating Means 7, a Cooling Means 9, a First Magnetic Field 5, and a Second Magnetic Field 11. In this embodiment, the Wheel 3 is rotatably connected to the Casing Means 27 via a Hub 17 and in-plane to the First Magnetic Field 5. The Second Magnetic Field 11 is preferably perpendicular to the plane of the Wheel 3, and therefore also orthogonal to the First Magnetic Field 5.

The Wheel 3 is rotatably attached to the Casing Means 27. Preferably, the Hub 17 is fixedly attached to the Casing Means 27 and the Wheel 3 is rotatably attached to Hub 17. Although the Wheel 3 is depicted as circular, it can have any shape including, oval shaped, rectangular, square shaped as well as others as known in the art, but is preferably circular. The Wheel 3 can also have a variety of unique shapes such as a saw blade shape, fan blade shaped, propeller shaped, etc.

The Wheel 3 has at least one Heated Area 13 exposed to heat from the Heating Means 7. The Heating Means 7 supplies Thermal Energy to the Heated Area 13 of the Wheel 3, heating the Heated Area 13 at or above it Curie Point, causing the Heated Area 13 to become at least substantially paramagnetic.

The First Magnetic Field 5, having only a negligible effect on the temporarily paramagnetic Heated Area 13, produces a force only upon the AMA 15 of the Wheel 3. The AMA 15 is the active magnetic area of the Wheel 3, the portion of the Wheel 3 that is not the paramagnetic Heated Area 13. Therefore, the force applied to the AMA 15 of the Wheel 3 causes the Wheel 3 to rotate clockwise as the AMA 15 interacts with the First Magnetic Field 5 to position itself more directly within the First Magnetic Field 5. As the Wheel 3 rotates, the portion of the Wheel 3 previously within the Heated Area 13 rotates and is cooled by the Cooling Means 9, restoring the ferromagnetic properties of the material. Likewise, the portion of the Wheel 3 previously in a ferromagnetic state and not heated rotates and is heated by the Heating Means 7. Therefore, the Wheel 3 continuously rotates as it is heated and cooled within the First Magnetic Field 5.

Figure 5B:
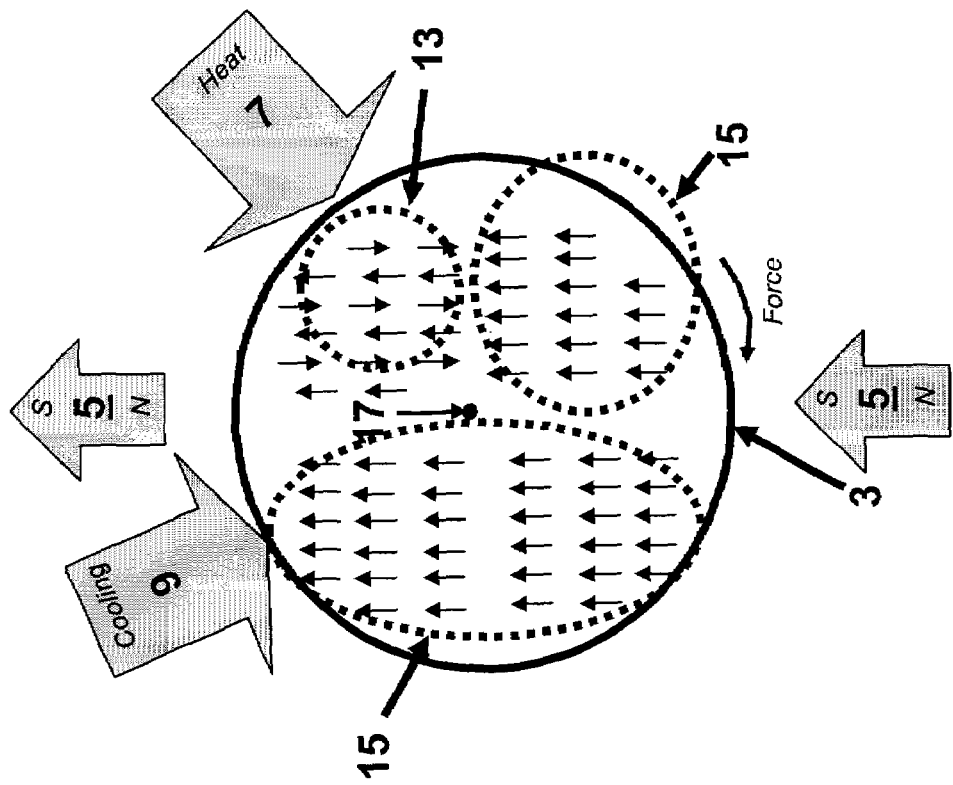
FIG. 5b shows the magnetic domains of a heated ferromagnetic, electrically conductive wheel having a rotational force generated by an Active Magnetic Area.
Figure 5A:
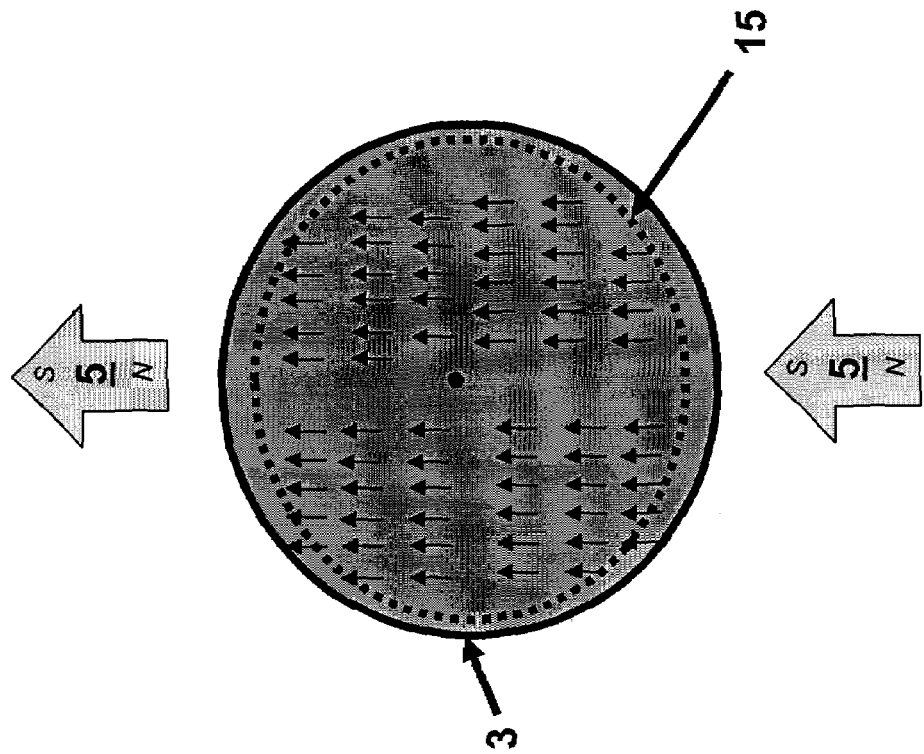
FIG. 5a shows the magnetic domains of a ferromagnetic, electrically conductive wheel.

FIG. 5a shows the Wheel 3 and the First Magnetic Field 5, without any Thermal Energy applied. In this state, the Magnetic Domains of the Wheel 3 align with the First Magnetic Field 5 and no rotational force is generated.

FIG. 5b shows the Wheel 3 in the First Magnetic Field 5 with Thermal Energy applied by a Heating Means 7. In this state, the Heating Means 7 heats the Heated Area 13 of the Wheel 3 beyond its Curie Point, thereby making the Heated Area 13 paramagnetic.

As the Heated Area becomes paramagnetic, an Active Magnetic Area (AMA) 15 generates a force on the Wheel 3 in response to the new magnetic properties of the Wheel 3 in the presence of the First Magnetic Field 5. The AMA 15 generates a force due to the creation of the Heated Area 13. As the Heated Area 13 is paramagnetic and has only a minimal amount of magnetic interaction, the AMA 15 produces a force to position itself more directly in the First Magnetic Field 5, therefore pushing the Heated Area 13 away from the First Magnetic Field 5. Therefore, there is a force induced on the AMA 15 by the First Magnetic Field 5. This force causes the Wheel 3 to rotate, counter (as shown in FIG. 5b).

In this embodiment, the portion of the Wheel 3 previously within the Heated Area 13 rotates and is cooled by the Cooling Means 9, restoring the ferromagnetic properties of the material. Likewise, part of the Wheel 3 previously in a ferromagnetic state and not heated rotates and is heated by the Heating Means 7. Therefore, as the state shown in FIG. 5b is maintained, the Wheel 3 continuously rotates from the force generated by the AMA 15.

In yet another alternative embodiment, the Heated Area 13 is greater than half of the Wheel 3, preferably about ¾ of the Wheel 3. In this embodiment, the AMA 15 is the area of the Wheel 3 not apart of the Heated Area 13. Therefore, the force from the magnetic interaction between the AMA 15 and the First Magnetic Field 5 is relatively unopposed by the rest of the Wheel 3, now paramagnetic, and will therefore rotate the Wheel 3. This may be preferable in some instances; however the heating of the entire Wheel 3 may use more energy and require more energy to be used in the Cooling Means 9 to cool a portion of the Wheel 3 below its Curie Point.

Referring back to FIG. 1, as the Wheel 3 rotates the movement of the Wheel 3 within the First Magnetic Filed 5, the Second Magnetic Field 11, or a combination thereof induces an electrical current through at least an Electrically Induced Area 57 of the FECM positioned perpendicular to a vector component of the First Magnetic Filed 5, the Second Magnetic Field 11, or a combination thereof and the movement of the Wheel 3. The induced electrical current is then transferred from the Electrically Induced Area of the Wheel 3 to the Hub 17 and one or more electrodes 19. As the Wheel 3 moves, the Heated Area 13 and AMA 15 are continuously altered by Thermal Energy from the Heating Means 7 thereby continuously moving the FECM and generating electricity through the Hub 17 and the one or more electrodes 19. Preferably, an electric load is connected to the Hub 17 and one or more electrodes 19.

Ferromagnetic, Electrically Conductive Material (FECM)

The Wheel 3 is an embodiment of a FECM. The FECM is ferromagnetic at a temperature below its Curie Point and is electrically conductive. Preferably, the FECM has a minimal electrical resistance, and has a Curie Point optimized for the Heating Means 7 and Cooling Means 9.

The FECM may be a solid (as shown in FIG. 1), a fluid (shown in FIG. 2) or combinations thereof. Various shapes and methods may be used as known in the art. In the alternative, the FECM may be a ferromagnetic material, which may or may not be conductive, having a conductive layer or coating. In this embodiment, the FECM has a conductive layer and a ferromagnetic layer. Preferably, the FECM has a thick ferromagnetic layer and a thin conductive layer. More preferably, the FECM is made of a single material which is both ferromagnetic and electrically conductive.

The Curie Point is the temperature at which the FECM losses its ferromagnetic properties. At temperatures below the Curie Point, the magnetic moments of the FECM align creating one or more magnetic domains. As the temperature of the FECM increases towards the Curie Point, thermal fluctuations increasingly destroy this alignment, until the net magnetization becomes negligible (relative to the ferromagnetic state) at and above the Curie Point. Therefore, above the Curie Point, the FECM is paramagnetic, having a significantly reduced magnetization.

Suitable examples of the FECMs include, but are not limited to, Co, Fe, $FeOFe_2O_3$, $NiOFe_2O_3$, $CuOFe_2O_3$, $MgOFe_2O_3$, MnBi, Ni, MnSb, $MNOFe_2O_3$, $Y_3Fe_5O_{12}$, $CrO_2$, MnAs, Gd, Dy, EuO, and combinations thereof, as well as others known in the art. In a preferred embodiment, the FECM is made of $CrO_2$, having a Curie Point at about 386 K (Kelvins) (~235° F.).

In the alternative, the FECM may be synthesized by various methods, such as using an iron powder in a fluid with a high coefficient of thermal expansion. For example, iron may be suspended in mercury or gallium.

The First Magnetic Field

The First Magnetic Field 5 is generated through the FECM, a Wheel 3 in the embodiment shown in FIG. 1. The First Magnetic Field 5 generates the movement as the Heated Area 13 changes from a ferromagnetic state to a paramagnetic state as it is heated to its Curie Point. If the FECM is planar, such as the Wheel 3 in FIG. 1, the First Magnetic Field 5 is preferably in-plane with the FECM. Preferably, the First Magnetic Field 5 is one or more permanent magnets positioned close to the FECM, providing a more compact design.

The strength of the First Magnetic Field 5 is preferably optimized for the desired output considering factors such as size, weight, cost, and reliability. Preferably, the First Magnetic Field 5 is a hard magnet. In the alternative, the First Magnetic Field 5 may be a soft magnetic, which may be more efficient in designing where the Wheel 3 rotation is not continuous.

Various methods, as known in the art, may be used to generate the First Magnetic Field 5 such as permanent magnets, earth magnetic, powered magnets, super conducting magnets, electromagnetic sources and combinations thereof. In a preferred embodiment, one or more, preferably one, permanent magnets are used to generate the First Magnetic Field 5.

The Second Magnetic Field

The Second Magnetic Field 11 is generated through the FECM. In the embodiment shown in FIG. 1, the Second Magnetic Field 11 is preferably about perpendicular, more preferably perpendicular, to the FECM, a Wheel 3. The Second Magnetic Field 11 induces a current from the motion of the FECM, which is captured, for example by one or more electrodes. Preferably, the Second Magnetic Field 11 is about perpendicular to the movement of the FECM. Preferably, the Second Magnetic Field 11 is one or more permanent magnets positioned close to the FECM, providing a more compact design.

Various methods, as known in the art, may be used to generate the Second Magnetic Field 11 such as permanent magnets, earth magnetic, powered magnets, super conducting magnets, electromagnetic sources and combinations thereof. In a preferred embodiment, one or more, preferably one, permanent magnets are used to generate the Second Magnetic Field 11.

The strength of the Second Magnetic Field 11 is preferably optimized for energy production considering factors such as size, weight, cost, and reliability. Preferably, the Second Magnetic Field 11 is a hard magnet. In the alternative, the Second Magnetic Field 11 may be a soft magnetic, which may be more efficient in designing where the Wheel 3 rotation is stopped and started.

In the alternative, the First Magnetic Field 5 and the Second Magnetic Field 11 are generated by the same source, whereby the First Magnetic Field 5 and the Second Magnetic Field 11 are vector components from a single magnetic source. For example, a permanent magnetic may produce a single magnetic field having vector components for the First Magnetic Field 5 and the Second Magnetic Field 11. As an illustrative example, a single permanent magnetic may produce a magnetic field having a vector 45 degrees from the plane of the FECM.

Figure 4:
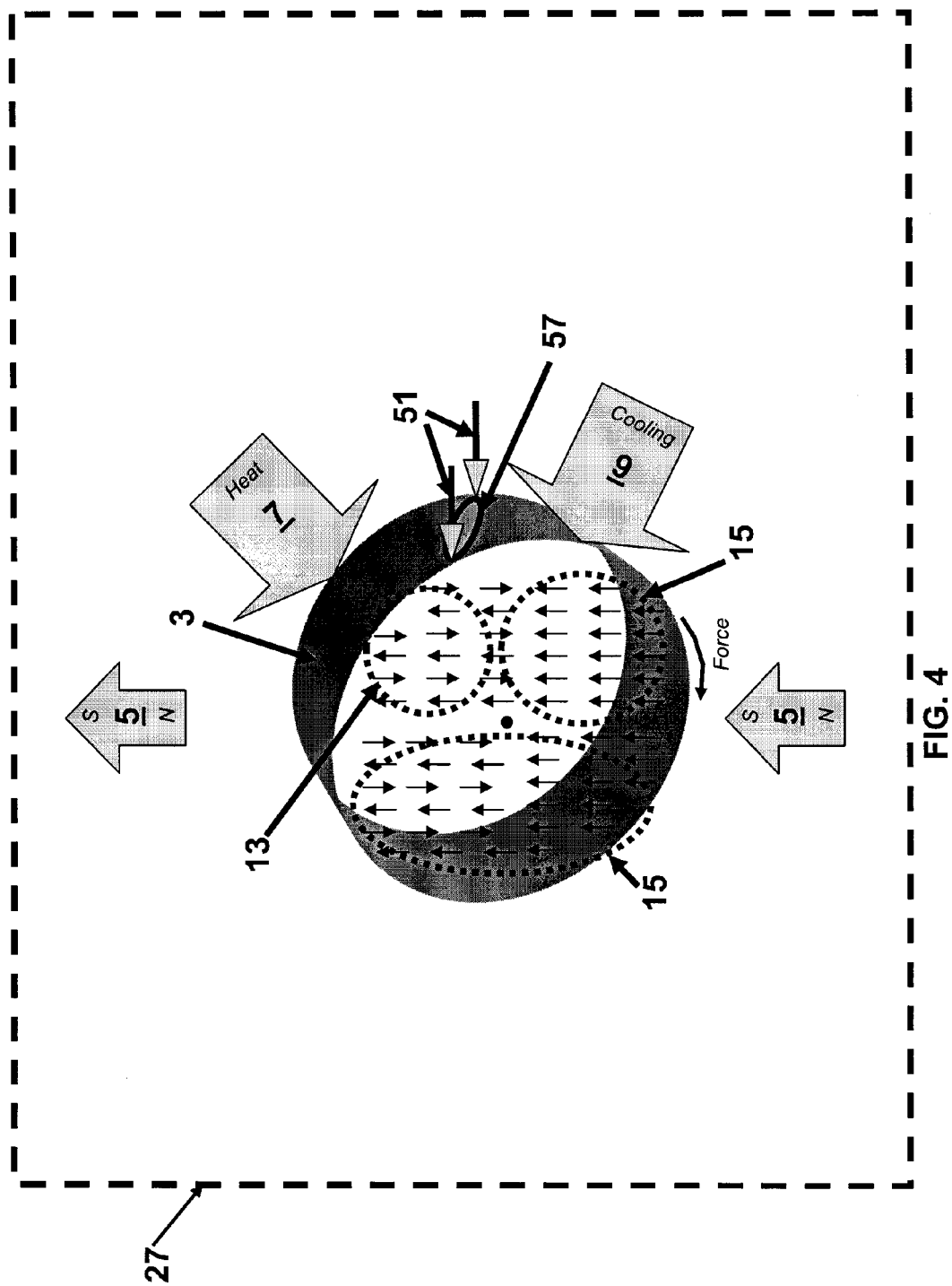
FIG. 4 depicts an embodiment of a Thermal to Electricity Converter using the thermal magnetic properties of a rotated solid material using a single in-plane magnetic field.

In the alternative, the First Magnetic Field 5 and the Second Magnetic Field 11 are a single magnetic field capable of producing a force upon the FECM, while also inducing a current from the movement of the FECM. In this embodiment, the magnetic field generated does not have components for the First Magnetic Field 5 and the Second Magnetic Field 11, but a single magnetic field provides a means for moving the FECM, while also inducing a current from the movement of the FECM. FIG. 4 depicts one example of this embodiment where the Second Magnetic Field 11 is omitted. In FIG. 4, the First Magnetic Field 5 alone produces a movement from the magnetic interaction with the FECM in a ferromagnetic state and generates electricity from the movement of said FECM within the First Magnetic Field 5. The omission of the Second Magnetic Field 11 may reduce cost, and result in a lighter solution.

Heating Means

The Heating Means 7 provides heat to the Heated Area 13, heating it beyond its Curie Point. The Heated Area 13 is a portion of the FECM, a Wheel 3 in the embodiment shown in FIG. 1. Any known method of heating the FECM may be used. For example conduction, convection, or radiation may be used to heat or transfer heat to the FECM. The Heating Means 7 preferably includes a heat source and a heat transfer method.

Examples of suitable heat sources include, but are not limited heat sources such as diesel, gasoline and natural gas, radioactive source (e.g. U238), chemical reaction, solar, fission, geothermal, and combinations thereof based heaters, as well as others known in the art. Preferably, heat sources such as solar, fission, fuels, radioactive decay, geothermal, or combinations thereof based heaters are used by the Heating Means 7. Solar heat sources preferably use solar energy directly or indirectly. Preferably, solar energy is used as a source by directly passing solar rays to the FECM. In the alternative, solar energy may be transferred to a fluid which subsequently transfers thermal energy to the FECM. In a preferred embodiment, geothermal heat is as a heat source.

Examples of suitable heat transfer methods include, but are not limited to radiation and heat exchangers such as gases, liquids, solids, or combinations thereof, more preferably liquid metals or ambient air, as well as other means known in the art. In a preferred embodiment, liquid hydrogen or helium is used to transfer heat.

Cooling Means

The Cooling Means 9 provides cooling to a portion of the FECM, a Wheel 3 in the embodiment shown in FIG. 1, cooling it below its Curie Point. Any known method of cooling the FECM may be used. For example the heat may be transferred using various heat exchangers for example, but not limited to, air cooling, heat sinks, etc.) and combinations thereof, as well as other methods known in the art.

In one embodiment, the Cooling Means 9 is one or more heat transfer mechanisms (convection, conduction, radiation) that reject waste heat to the environment, as known by others in the art. In a preferred embodiment, the Cooling Means 9 is ambient air and the FECM is air cooled. In the alternative, another thermally conductive fluid is used to transfer heat from the FECM, preferably to a thermal conductive heat sink to be cooled.

One or More Electrodes

One or more Electrodes 19 are used to transfer generated electricity for further processing or use. The one or more Electrodes 19 are positioned creating an Electrically Induced Area 57, at least a portion of the FECM which is perpendicular to the movement of the FECM and a vector component of a magnetic field, preferably the First Magnetic Field 5, the Second Magnetic Field 11, or a combination thereof. The one or more Electrodes 19 are each electrically conductive and may have a variety of shapes.

The one or more Electrodes 19 should be constructed and positioned as to not interfere with the movement of the FECM, such as the Wheel 3 in the embodiment shown in FIG. 1. Preferably, the one or more Electrodes 19 are conductive wire brushes, ball bearings, or a conductive fluid designed for low mechanical and electrical resistance.

In the embodiment shown in FIG. 1, electricity is generated between the Hub 17 and one or more Electrodes 19. In this embodiment, the Hub 17 is electrically conductive. The one or more Electrodes 19 are connected to the Wheel 3 whereby electrical contact is made between the one or more electrodes 19 and the Wheel 3, while also allowing the Wheel 3 to freely rotate. Preferably, the one or more Electrodes 19 are conductive wire brushes, ball bearings, or a conductive fluid designed for low mechanical and electrical resistance.

Casing Means

The Casing Means 27 is any means to connect the FECM, a Wheel 3 in the embodiment shown in FIG. 1, to the Heating Means 7 and the Cooling Means 9 in the presence of the First Magnetic Field 5 and the Second Magnetic Field 11. In a preferred embodiment, the Casing Means 27 is an aluminum box connecting a permanent magnet generating the First Magnetic Field 5, a permanent magnet generating the Second Magnetic Field 11, the Heating Means 7, and the Cooling Means 9. The Casing Means 27 can be made from a variety of materials and structures. The First Magnetic Field 5, the Second Magnetic Field 11, the Heating Means 7, and the Cooling Means 9 are preferably all contained within the Casing Means 27, but in the alternative, one or more of the First Magnetic Field 5, the Second Magnetic Field 11, the Heating Means 7, and the Cooling Means 9 may be positioned or extend outside of the Casing Means 27. For example, the First Magnetic Field 5, the Second Magnetic Field 11, or a combination thereof, may be positioned outside the Casing Means 27, whereby the generated magnetic fields pass through the Casing Means 27.

Likewise, the Heating Means 7, the Cooling Means 9 or a combination thereof, may be positioned outside of the Casing Means 27. In one embodiment, the Casing Means 27 may have an opening for the Heating Means 7 and the Cooling Means 9. In another embodiment, the Casing Means 27 may be thermally conductive, whereby heat is passed between the Heating Means 7 to the FECM, and heat is passed between the FECM and the Cooling Means 9. If heat is transferred through the Casing Means 27, thermal insulation is preferably placed to prevent heat from transferring directly between the Heating Means 7 and the Cooling Means 9.

Figure 2:
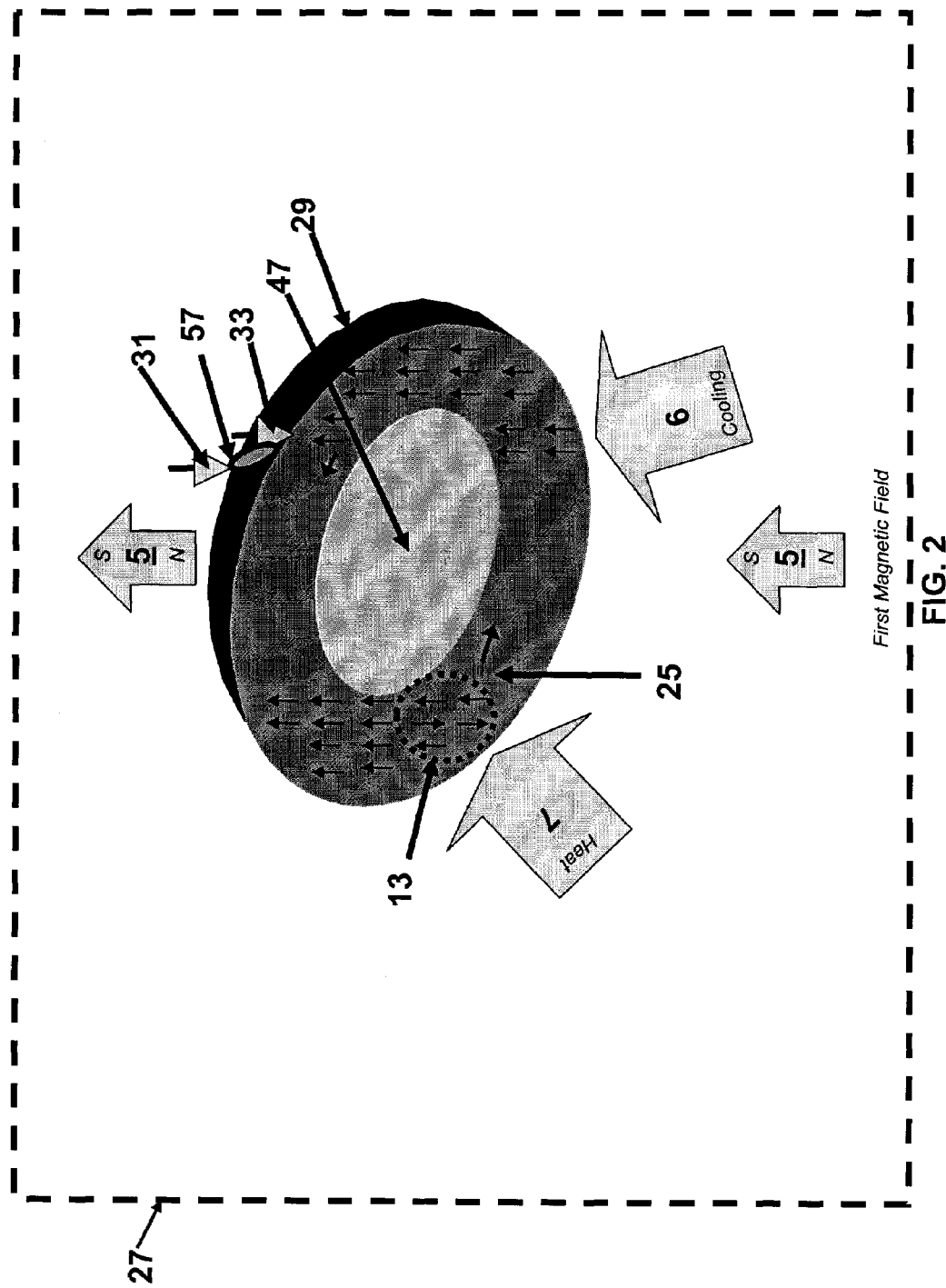
FIG. 2 depicts an embodiment of a Thermal to Electricity Converter using thermal magnetic properties of a fluid.

FIG. 2 Thermal to Electricity Converter Using the Thermal Magnetic Properties of Fluid FIG. 2 depicts another embodiment of a Thermal to Electricity Converter using the thermal magnetic properties of a Ferromagnetic, Electrically Conductive Fluid 25. A Casing Means 27 contains a Tube 29, a Heating Means 7, a Cooling Means 9, and a means for generating a First Magnetic Field 5. In this embodiment, the Tube 29 contains a Ferromagnetic, Electrically Conductive Fluid 25. The Fluid 25 within the interior of the Tube 29 is positioned in-plane to the First Magnetic Field 5. The Tube 29 preferably forms a circular ring having an inner area and an outer area.

A Heating Means 7 supplies Thermal Energy to the Heated Area 13 of the Tube 29, causing the Fluid 25 within the Heated Area 13 of the Tube 29 to become paramagnetic as it is heated beyond its Curie Point. Although passing through the Fluid 25, the First Magnetic Field 5 produces a force on only within the AMA of the Fluid 25, the area outside of the Heated Area 13. Therefore, the force applied to the Fluid 25 in AMA cases the Fluid 25 to flow through the Tube 29 as the AMA 15 of the Fluid 25 positions itself more directly in the First Magnetic Field 5.

As the Fluid 25 flows through the Tube 29, the Fluid 25 previously heated while in the Heated Area 13, moves outside the Heated Area 13, where it is cooled by the Cooling Means 9, restoring the ferromagnetic properties of the Fluid 25 and generating a force (from the First Magnetic Field 5) to continue the flow of the Fluid 25.

As the Fluid 25 flows through the Tube 29, one or more Bottom Electrodes 31 and one or more Top Electrodes 33 are used to transfer generated electricity for further processing or use. The one or more Bottom Electrodes 31 and one or more Top Electrodes 33 are positioned creating an Electrically Induced Area 57, at least a portion of the Fluid 25 which is perpendicular to the movement of the Fluid 25 and a vector component of the First Magnetic Field 5. The one or more Bottom Electrodes 31 and one or more Top Electrodes 33 are each electrically conductive and may have a variety of shapes. Therefore, electricity is generated across one or more Bottom Electrodes 31 and one or more Top Electrodes 33 from Thermal Energy across the Heated Area 13 of the Tube 29.

As shown in FIG. 2, the Fluid 25 is a liquid, gas or a combination thereof, preferably the Fluid 25 is a liquid. Although the movement of the Fluid 25 does not rely on pressure or thermal expansion, it is preferably confined by a Tube 29, as shown in FIG. 2. As known in the art, conventional thermal mass transport drives can add to the movement of the Fluid 25 beyond the force generated by magnetic interaction with the First Magnetic Field 5. Although the Tube 29 depicted in FIG. 2 is oval shaped, it can have any shape including, circular shaped, rectangular, square shaped, as well as others as known in the art, but is preferably oval shaped. The Tube 29 containing the Fluid 25 can also be a variety of unique shapes such as a saw blade shape, fan blade shaped, propeller shaped, etc.

The Tube 29, shown in FIG. 2, confines the Fluid 25 and is preferably made of a plastic or a ceramic. The Tube 29 is preferably constructed of an electrically insulating material to prevent an electrical short between the one or more Top Electrodes 33 and the one or more Bottom Electrode 31. In the alternative, the Tube 29 is constructed of an electrically conductive material, but has an electrically insulating separation between the Top and the Bottom of the Tube 29 in order to prevent an electrical short.

FIG. 2 shows an embodiment using one or more Top Electrodes 33 and one or more Bottom Electrodes 31, whereby the area between the one or more Top Electrodes 33 and the one or more Bottom Electrode 31 is perpendicular to the First Magnetic Field 5 and the movement of the Fluid 25. Each electrode from the one or more Top Electrodes 33 has a corresponding Bottom Electrode from the one or more Bottom Electrodes 31. Each electrode from the one or more Top Electrodes 33 and the one or more Bottom Electrodes 31 are made of an electrically conducting material and are shaped to minimize any interference with the flow of the Fluid 25. In a preferred embodiment, the one or more Top Electrodes 33 and the one or more Bottom Electrodes 31 are all flush against the inner wall of the Tube 29.

In the alternative, a plurality Magnetic Fields may be used. For example a second magnetic field, orthogonal to the First Magnetic Field 5, may be used to generate electricity from the flow of the Fluid 25 using electrodes in various configurations.

The Fluid 25 is preferably a liquid synthesized by various methods, such as using an iron powder in a fluid. For example, iron may be suspended in mercury or gallium. In another embodiment, the Fluid 25 is salt water.

Preferably, a Magnetic Conductor 47 fills the inner area created by the Tube 29. The Magnetic Conductor 47 is magnetically conductive and may be constructed of one or more materials. Preferably, the Magnetic Conductor 47 is made of iron and electrically and thermally insulated from the Fluid 25. For example, the Tube 29 or one or more additional layers may serve as thermal and electric insulators.

Figure 3:
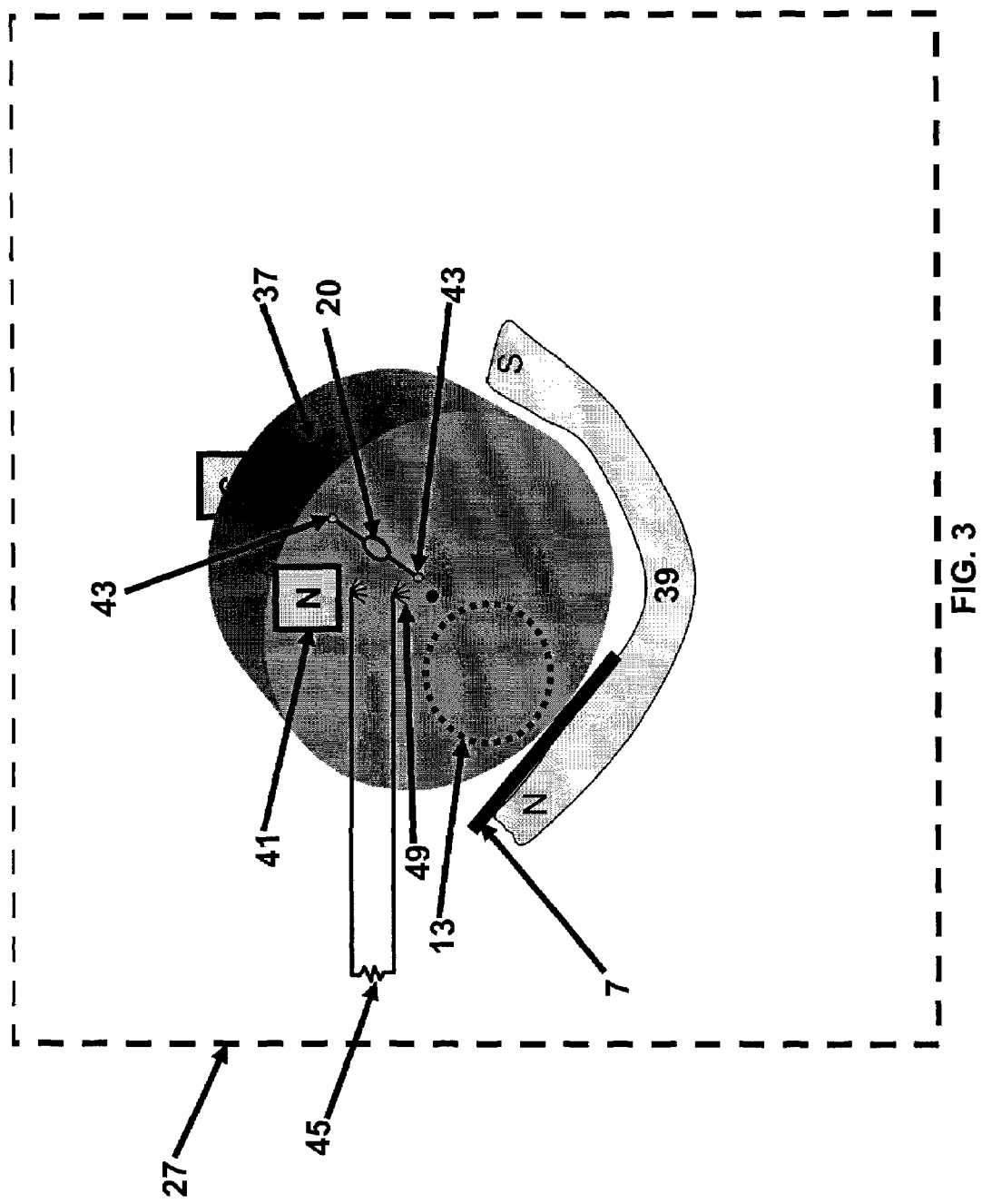
FIG. 3 depicts an embodiment of a Thermal to Electricity Converter using the thermal magnetic properties of a Wheel having one or more electrically conductive Coils.

FIG. 3 Thermal to Electricity Converter Using the
Thermal Magnetic Properties of Solid Material
Having One or More Electrically Conductive Coils FIG. 3 depicts an embodiment of a Thermal to Electricity Converter whereby the FECM comprises a Ferromagnetic Wheel 37 having one or more electrically conductive Coils 20. In this embodiment, a Casing Means 27 contains the Ferromagnetic Wheel 37 having one or more electrically conductive Coils 20 (for clarity, only one coil is shown in FIG. 3, although any number may be used), a Heating Means 7, a First Magnet 39, a Second Magnet 41, and an Electrical Load 45.

If the Ferromagnetic Wheel 37 is electrically conductive, an insulating layer is preferably positioned between each coil and the Ferromagnetic Wheel 37. In a preferred embodiment, the FECM is a $CrO^2$ Wheel 37 having a plurality of coils each insulated from each other and the Ferromagnetic Wheel 37 by an electrically insulating layer made of porcelain, glass, plastics, or a combination thereof.

In this embodiment, the Electrically Induced Area are the one or more Coils 20, each have Two Electrodes 43 which are preferably alternately electrically connected to a Load 45. In this embodiment, the Ferromagnetic Wheel 37 is rotatably connected to the Casing Means 27 via a Hub 17 and in-plane to the magnetic field generated by the First Magnet 39. The magnetic field generated by the Second Magnet 41 is preferably perpendicular to the plane of the Ferromagnetic Wheel 37, and therefore also perpendicular to the magnetic field generated by the First Magnet 39.

In this embodiment, the First Magnet 39 is preferably a permanent magnet wrapped around part of the Ferromagnetic Wheel 37, whereby a magnetic field is created in-plane to the Ferromagnetic Wheel 37. Preferably, the Ferromagnetic Wheel 37 is positioned close to the First Magnet 39, providing a compact device. In this embodiment, the Second Magnet 41 is preferably a permanent magnet having a horse-shoe shape. Preferably, the magnetic field generated by the Second Magnet 41 is perpendicular to the plane of the Ferromagnetic Wheel 37.

The Ferromagnetic Wheel 37 has a Heated Area 13 exposed to heat from the Heating Means 7. The Heating Means 7 supplies Thermal Energy to the Heated Area 13 of the Ferromagnetic Wheel 37, causing the Heated Area 13 of the Ferromagnetic Wheel 37 to become paramagnetic as it is heated beyond the Curie Point of the Ferromagnetic Wheel 37 material. The magnetic field produced by the First Magnet 39 therefore produces a force only upon the AMA of the Ferromagnetic Wheel 37, the area outside of the Heated Area 13. Therefore, the Ferromagnetic Wheel 37 rotates from the force generated by the AMA of the Ferromagnetic Wheel 37 as the AMA positions itself more directly within the field created by the First Magnet 39.

As the Ferromagnetic Wheel 37 rotates the material of the Ferromagnetic Wheel 37 previously heated, rotates out of the Heated Area 13, where it is cooled by ambient air, restoring the ferromagnetic properties of the material and generating a force (from the First Magnet 39) to continue the rotation of the Ferromagnetic Wheel 37.

As the Ferromagnetic Wheel 37 rotates, the magnetic field generated by the First Magnet 39, the magnetic field generated by the Second Magnet 41, or a combination thereof induce an electrical current in a coil from the Coils 20 between the Two Electrodes 43. The current is supplied into the Load 45 via an electrical connection between a terminal on the Load 45 and a corresponding electrode from the Two Electrodes 43. Preferably, the Load 45 is alternately electrically connected to the Two Electrodes 43 by electrically conductive Wire Brushes 49 as the Ferromagnetic Wheel 37 is rotated. Therefore, Electricity is generated within the Coils 20 from Thermal Energy across the Heated Area 13 of the Ferromagnetic Wheel 37.

When the Coils 20 are connected to the Two Electrodes 43, the Coils 20 each preferably move perpendicular to the magnetic field generated by the First Magnet 39, the magnetic field generated by the Second Magnet 41, or a combination thereof. For example, the Coils 20 may each be a conductive layer, coating, wire, etc, placed above, below, or within the Ferromagnetic Wheel having a Conductive Layer 37. Alternately, the Ferromagnetic Wheel 37 may have one or more conductive layers separated by an insulating material, creating a coil.

In a preferred embodiment, as shown in FIG. 3, the Coils 20 are one or more conductive coils running perpendicular to the magnetic field generated by the Second Magnet 41. Although FIG. 3 depicts a single coil, any number of coils may be used, as known in the art. Preferably, a plurality of electrically conductive coils are used.

As known in the art, any conductive path may be used in place of each coil from the Coils 20. For example, straight conductors may run from the outer rim of the Ferromagnetic Wheel 37 to an inner hub. Preferably, one or more Coils 20 are used since one or more coils will be one efficient method of generating an electrical current from the rotation of the Ferromagnetic Wheel 37.

The Ferromagnetic Wheel 37 is made of a material which is ferromagnetic at a temperature below its Curie Point. Preferably, the Ferromagnetic Wheel 37 has a Curie Point optimized for the Heating Means 7 and Cooling Means, ambient air and the each coil has a minimal electrical resistance.

FIG. 4 Thermal to Electricity Converter Using the
Thermal Magnetic Properties of Solid Material
Using a Single in-Plane Magnetic Field FIG. 4 depicts an embodiment of a Thermal to Electricity Converter using the thermal magnetic properties of solid material using only a First Magnetic Field 5. This embodiment is the same as the embodiment shown in FIG. 1, except for the omission of the Second Magnetic Field 11 and the use of Two Perpendicular Electrodes 51 instead of the Hub 17 and one or more Electrodes 19. This embodiment may be desirable when trying to minimize the weight and size of the Thermal to Electricity Converter.

As in FIG. 1, the Wheel 3 has at least one Heated Area 13 exposed to heat from the Heating Means 7. The Heating Means 7 supplies Thermal Energy to the Heated Area 13 of the Wheel 3, heating the Heated Area 13 at or above it Curie Point, causing the Heated Area 13 to become at least substantially paramagnetic.

The First Magnetic Field 5, having only a negligible effect on the temporarily paramagnetic Heated Area 13, produces a force only upon the AMA 15 of the Wheel 3. The AMA 15 is the active magnetic area of the Wheel 3, the portion of the Wheel 3 that is not the paramagnetic Heated Area 13. Therefore, the force applied to the AMA 15 of the Wheel 3 causes the Wheel 3 to clockwise as the AMA 15 interacts with the First Magnetic Field 5 to position itself more directly within the First Magnetic Field 5. As the Wheel 3 rotates, the portion of the Wheel 3 previously within the Heated Area 13 rotates and is cooled by the Cooling Means 9, restoring the ferromagnetic properties of the material. Likewise, the portion of the Wheel 3 previously in a ferromagnetic state and not heated rotates and is heated by the Heating Means 7. Therefore, the Wheel 3 continuously rotates as it is heated and cooled within the First Magnetic Field 5.

In this embodiment, Two Perpendicular Electrodes 51 are used to transfer generated electricity for further processing or use. The one or more Electrodes 19 are positioned creating an Electrically Induced Area 57, at least a portion of the Wheel 3 which is perpendicular to the movement of the Wheel 3 and a vector component of a the First Magnetic Field 5. The Two Perpendicular Electrodes 51 are each electrically conductive and may have a variety of shapes.

In this embodiment, the First Magnetic Field 5 and the Heat Means 7 cause the movement of the FECM, and the First Magnetic Field 5 generates electricity across Two Perpendicular Electrodes 51. Preferably, electricity is extracted off the Two Perpendicular Electrodes 51 at a point where the Wheel 3 is traveling at a vector about perpendicular to the First Magnetic Field 5, to generate the most electricity.

In an alternative embodiment, the direct electricity generating features of the FECM may be forgone. For example a ferromagnetic material may be moved by thermal energy using the mechanisms described above and electricity generated from various means, preferably by an electric generator. In the alternative, a ferromagnetic material may be moved by thermal energy using the mechanisms described above to move a fluid or solid. For example a flywheel, fan or water pump may be powered by thermal energy using the mechanisms described above.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

The invention claimed is:

1. A device comprising:
   a. a ferromagnetic material having a curie point;
   b. means for generating one or more magnetic fields running through said ferromagnetic material;
   c. each said magnetic field having one or more vector components;
   d. a means for heating a portion of said ferromagnetic material creating a heated area whereby said heated area is heated to a temperature at or above said curie point and said ferromagnetic material moves in the presence of said one or more magnetic fields; and
   e. a means for cooling a portion of said ferromagnetic material to a temperature below said curie point.

2. The device of claim 1 further comprising a means for generating electricity from said movement of said ferromagnetic material.

3. The device of claim 1 further comprising:
   a. Said ferromagnetic material is a ferromagnetic, electrically conductive material (FECM);
   b. an electrically induced area comprising at least a portion of said FECM and positioned perpendicular to a vector component of a magnetic field from said one or more magnetic fields and said movement of said FECM, whereby an electrical current is induced within said electrically induced area; and
   c. one or more electrodes electrically connected to said electrically induced area whereby said induced electrical current is transferred to said one or more electrodes.

4. The device of claim 3 whereby said one or more magnetic fields is a single magnetic field.

5. The device of claim 3 whereby said one or more magnetic fields is a plurality of magnetic fields.

6. The device of claim 3 whereby said one or more magnetic fields are two orthogonal magnetic fields.

7. The device of claim 3 whereby said FECM comprises a material selected from the group of materials consisting of Co, Fe, $FeOFe_2O_3$, $NiOFe_2O_3$, $CuOFe_2O_3$, $MgOFe_2O_3$, MnBi, Ni, MnSb, $MNOFe_2O_3$, $Y_3Fe_5O_{12}$, $CrO_2$, MnAs, Gd, Dy, EuO, $O_2$, and combinations thereof.

8. The device of claim 3 whereby said FECM comprises a ferromagnetic material having an electrically conductive layer.

9. The device of claim 3 whereby said means for heating comprises a heating means selected from the list of heating means consisting of nuclear reactor, geothermal, solar, and combinations thereof based heating means.

10. The device of claim 3 whereby said FECM is a fluid contained within a tube whereby said fluid moves in the presence of said one or more magnetic fields.

11. The device of claim 10 whereby:
    a. said fluid comprises iron suspended in mercury or gallium;
    b. said means for cooling comprising a means for air cooling said fluid;
    c. said tube forming a circular ring having an inner area and an outer area;
    d. a magnetic conductor comprising iron filling said inner area;
    e. a first magnetic field in-plane to said tube;
    f. one or more top electrodes electrically connected to said fluid; and
    g. one or more bottom electrodes electrically connected to said fluid and positioned whereby the area between said one or more top electrodes and the one or more bottom electrodes is perpendicular to said first magnetic field and said movement of said fluid.

12. The device of claim 3 whereby:
    a. said FECM is comprises a wheel rotateably connected to a casing means;
    b. Said means for heating connected to said casing means;
    c. said means for cooling connected to said casing means; and
    d. said movement of said wheel is rotational.

13. The device of claim 12 whereby said Wheel comprises a material selected from the group of materials consisting of Co, Fe, $FeOFe_2O_3$, $NiOFe_2O_3$, $CuOFe_2O_3$, $MgOFe_2O_3$, MnBi, Ni, MnSb, $MNOFe_2O_3$, $Y_3Fe_5O_{12}$, $CrO_2$, MnAs, Gd, Dy, EuO, $O_2$, and combinations thereof.

14. The device of claim 12 whereby said Wheel comprises one or more electrically conductive coils connected to a ferromagnetic material.

15. The device of claim 12 whereby:
    a. said means for generating one or more magnetic fields comprises a first permanent magnet generating a first magnetic field and a second permanent magnet generating a second magnetic field;
    b. said first magnetic field orthogonal to said second magnetic field;
    c. said wheel comprising $CrO_2$ and one or more electrically conductive coils connected to a ferromagnetic material and positioned perpendicular to said second magnetic field and said movement of said wheel;

d. means for electrically insulating each electrically conductive coil from each other and said wheel;
e. said means for cooling comprising a means for air cooling said wheel;
f. said means for heating positioned between said wheel and said first permanent magnet; and
g. said one or more electrodes comprising one or more wire brushes electrically connected to said one or more coils.

16. The device of claim 12 whereby:
a. said wheel comprises $CrO_2$;
b. said means for generating one or more magnetic fields consisting a first permanent magnet generating a first magnetic field in-plane to said wheel;
c. said means for cooling comprising a means for air cooling said wheel; and
d. said one or more electrodes comprising one or more wire brushes electrically connected to said wheel and positioned whereby the area between the wire brushes is perpendicular to said first magnetic field and said rotation of said wheel.

17. A method comprising the steps of:
a. providing a ferromagnetic, electrically conductive material (FECM) having a curie point;
b. generating one or more magnetic fields running through said FECM each having one or more vector components;
c. heating a heated area at or above said curie point whereby said FECM moves in the presence of said one or more magnetic fields; and
d. cooling a portion of said FECM.

18. The method of claim 17 further comprising:
a. generating electricity from one or more electrodes electrically connected to an electrically induced area comprising at least a portion of said FECM and positioned perpendicular to a vector component of a magnetic field from said one or more magnetic fields and said movement of said FECM.

19. The method of claim 17 whereby said FECM is a fluid contained within a tube.

20. The method of claim 17 whereby said FECM is a wheel and said movement of said FECM is rotational.

* * * * *